(12) United States Patent
Wu

(10) Patent No.: US 9,179,099 B2
(45) Date of Patent: Nov. 3, 2015

(54) METHOD AND SYSTEM FOR IMPLEMENTING VIDEO CONFERENCE AND BROADBAND MOBILE HOTSPOT DEVICE

(75) Inventor: Jianning Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 130 days.

(21) Appl. No.: 14/001,199

(22) PCT Filed: Jul. 19, 2011

(86) PCT No.: PCT/CN2011/077294
§ 371 (c)(1), (2), (4) Date: Aug. 23, 2013

(87) PCT Pub. No.: WO2012/159333
PCT Pub. Date: Nov. 29, 2012

(65) Prior Publication Data
US 2013/0321559 A1 Dec. 5, 2013

(30) Foreign Application Priority Data

May 20, 2011 (CN) .......................... 2011 1 0132920

(51) Int. Cl.
*H04N 7/15* (2006.01)
*H04L 29/06* (2006.01)
(52) U.S. Cl.
CPC ................ *H04N 7/152* (2013.01); *H04L 29/06* (2013.01); *H04L 65/403* (2013.01); *H04L 65/4038* (2013.01)
(58) Field of Classification Search
USPC .................. 348/14.02, 14.08, 14.09
See application file for complete search history.

(56) References Cited

U.S. PATENT DOCUMENTS 6,393,163 B1 * 5/2002 Burt et al. ...................... 382/294
6,693,649 B1 * 2/2004 Lipscomb et al. ............. 715/762
(Continued)

FOREIGN PATENT DOCUMENTS

CA 2258091 A1 12/1997
CN 1805537 A 7/2006
(Continued)

OTHER PUBLICATIONS

International Search Report dated Feb. 16, 2012 of PCT/CN2011/077294.

*Primary Examiner* — Joseph J Nguyen
(74) *Attorney, Agent, or Firm* — Banner & Witcoff, Ltd.

(57) ABSTRACT

A method and system for implementing a video conference and a broadband mobile hotspot device are disclosed in the present document. The method includes: each broadband mobile hotspot device participating in the conference sending a local panorama video image and voice signals to a multipoint conference server; the multipoint conference server sending the received panorama video images and voice signals to other broadband mobile hotspot devices participating in the conference except a sender; and after receiving panorama video images and voice signals of the other broadband mobile hotspot devices participating in the conference, each broadband mobile hotspot device participating in the conference mosaicking the local panorama video image and the received panorama video images as a conference panorama video image, and synchronizing the conference panorama video image with the received voice signals to send to a terminal device participating in the conference under the broadband mobile hotspot device.

13 Claims, 3 Drawing Sheets

(56) References Cited

U.S. PATENT DOCUMENTS

| | | | |
|---|---|---|---|
| 8,446,830 B2 * | 5/2013 | Wu et al. | 370/235 |
| 2006/0244819 A1 | 11/2006 | Pun et al. | |
| 2009/0092285 A1 * | 4/2009 | Keyes et al. | 382/103 |
| 2010/0040034 A1 | 2/2010 | Shah | |
| 2011/0025819 A1 * | 2/2011 | Gorzynski et al. | 348/14.07 |
| 2011/0096136 A1 * | 4/2011 | Liu et al. | 348/14.07 |
| 2012/0075407 A1 * | 3/2012 | Wessling | 348/14.08 |
| 2012/0078726 A1 * | 3/2012 | Black et al. | 705/14.66 |

FOREIGN PATENT DOCUMENTS

| | | |
|---|---|---|
| CN | 101710972 A | 5/2010 |
| CN | 102037726A A | 4/2011 |
| EP | 2288104 A1 | 2/2011 |
| JP | H10509571 A | 9/1998 |
| JP | 2000115737 A | 4/2000 |
| JP | 2003087250 A | 3/2003 |
| JP | 2009518996 A | 5/2009 |
| JP | 2009135589 A | 6/2009 |
| WO | 2010/073563 A1 | 7/2010 |

* cited by examiner

METHOD AND SYSTEM FOR IMPLEMENTING VIDEO CONFERENCE AND BROADBAND MOBILE HOTSPOT DEVICE

TECHNICAL FIELD

The present document relates to the wireless fidelity technology and third-generation mobile communication technology, and particularly, to a method and system for implementing a video conference, and a broadband mobile hotspot device.

BACKGROUND OF THE RELATED ART

The wireless communication technology has a significant impact on people's lives. The way of people using the wireless technology is updated continually. Applications of the wireless communication technology has penetrated as all aspects of people's lives and works, including daily used cellphones and radiophones and so on, wherein, technologies such as the 3rd Generation mobile communication technology (3G), Wireless Local Area Network (WLAN), Ultra Wide Band (UWB), bluetooth and broadband satellite system and so on are the hottest wireless communication technologies at the 21st century, and particularly the study and application of the broadband wireless communication technology are extremely active.

The 3G broadband wireless communication network is established on a cellular architecture and supports data services in a mobile environment. The cellular architecture supports signal handover between different cells, thereby a mobility with full network coverage is provided for users, and applications supported by the cellular architecture are mainly the 3G mobile telephone services. A Wireless Fidelity (Wi-Fi) wireless local area network is a short range wireless transmission technology which can support radio signals accessed by the Internet within a scope of hundreds of feet, and applications supported by the Wi-Fi wireless local area network are mainly accessed through portable and data-centered devices such as laptops, but not accessed through cellphoned-centered devices.

The Wi-Fi provides high bandwidth, but it is within a limited coverage area. Compared with the Wi-Fi, the 3G network supports the mobility across a wide area network, but a data throughput rate thereof is evidently lower than that of the Wi-Fi. Since the 3G and Wi-Fi have different advantages and limitations with respect to the coverage area and the bandwidth, the two technologies support different applications and satisfy different requirements.

Since the wireless communication network has a contradiction between bandwidth requirements and wireless network bandwidth shortage, a contradiction between user geographical distribution and unbalanced application requirement and a contradiction of coexistence between different technical advantages, it is determined that the wireless communication network is required to apply various technological means comprehensively, develop individualities of different technologies, integrate arrangements, solve different requirements of different areas and user groups on the bandwidths and services, and achieve the overall advantage and comprehensive ability of the wireless communication network.

The existing wireless network video conference system replaces the wired broadband access with the wireless broadband access for the access network part of the users based on a wired broadband network video conference system, and a terminal device accesses the conference system through a mobile network. Due to a bandwidth limitation of the mobile network access, the transmission of multimedia signals has a latency problem, and participants of the video conference must concentrate around the conference terminal device and face one terminal device to have the conference, which is restricted by that the conference room is required to be comparatively concentrated.

SUMMARY OF THE INVENTION

The technical problem required to be solved by the present document is to provide a method and system for implementing a video conference and a broadband mobile hotspot device, which can avoid a limitation on a video conference system resulted from transmission delay of a mobile network.

In order to solve the above technical problem, the present document provides a method for implementing a video conference, which comprises:

each broadband mobile hotspot device participating in the conference sending a local panorama video image and voice signals to a multipoint conference server;

the multipoint conference server sending the received panorama video images and voice signals to other broadband mobile hotspot devices participating in the conference except a sender; and after receiving panorama video images and voice signals of the other broadband mobile hotspot devices participating in the conference, each broadband mobile hotspot device participating in the conference mosaicking the local panorama video image and the received panorama video images as a conference panorama video image, and after synchronizing the conference panorama video image with the received voice signals, sending the synchronized conference panorama video image and voice signals to a terminal device participating in the conference under the broadband mobile hotspot device.

Alternatively, the above method further comprises:

before sending the local panorama video image and the voice signals to the multipoint conference server, each broadband mobile hotspot device participating in the conference receiving video image signals and voice signals sent by the terminal device participating in the conference under each broadband mobile hotspot device participating in the conference, separating the video image signals from the voice signals, performing image mosaicking processing on the video image signals, generating the local panorama video image, synchronizing the local panorama video image with the voice signals, and sending the synchronized local panorama video image and voice signals to the multipoint conference server.

Alternatively, the above method further comprises:

before sending the video image signals and the voice signals to the broadband mobile hotspot device, the terminal device participating in the conference under each broadband mobile hotspot device participating in the conference collecting video image signals and voice signals of a user, performing synchronization processing, packaging the video image signals and the voice signals, obtaining a multimedia package, and sending the multimedia package to a broadband mobile hotspot device to which the terminal device participating in the conference under each broadband mobile hotspot device participating in the conference belongs through a wireless local area network adapter.

Alternatively, the above method further comprises:

before collecting the video image signals and the voice signals of the user, the terminal device participating in the conference under each broadband mobile hotspot device participating in the conference logging in to the broadband mobile hotspot device to which the terminal device participating in the conference under each broadband mobile hotspot device participating in the conference belongs through the wireless local area network adapter, and asking the multipoint conference server for joining the conference;

the multipoint conference server authenticating the terminal device, and returning permission information or rejection information to the terminal device; and the terminal device starting to collect the video image signals and the voice signals of the user after receiving the permission information.

A system for implementing a video conference comprises: a broadband mobile hotspot device and a multipoint conference server, wherein:

the broadband mobile hotspot device is configured to: send a local panorama video image and voice signals to the multipoint conference server; after receiving panorama video images and voice signals sent by other broadband mobile hotspot devices from the multipoint conference server, mosaic the local panorama video image and the received panorama video images as a conference panorama video image, and after synchronizing the conference panorama video image with the received voice signals, send the synchronized conference panorama video image and voice signals to a terminal device participating in the conference under the broadband mobile hotspot device; the multipoint conference server is configured to: send the local panorama video image and the voice signals sent by the broadband mobile hotspot device to the other broadband mobile hotspot devices participating in the conference except a sender.

Alternatively, the broadband mobile hotspot device comprises a wireless access point and a video image mosaicking processor, wherein:

the wireless access point is configured to: send the local panorama video image and the voice signals to the multipoint conference server; receive the panorama video images and the voice signals sent by the other broadband mobile hotspot devices participating in the conference; and send the conference panorama video image and voice signals synchronized by the video image mosaicking processor to the terminal device participating in the conference under the broadband mobile hotspot device;

the video image mosaicking processor is configured to: mosaic the local panorama video image and the panorama video images received by the wireless access point as the conference panorama video image, and synchronize the conference panorama video image with the received voice signals.

Alternatively, the wireless access point is further configured to: receive video image signals and voice signals sent by the terminal device participating in the conference under the broadband mobile hotspot device;

the video image mosaicking processor is further configured to: separate the video image signals from the voice signals received by the wireless access point, perform image mosaicking processing on the video image signals, generate the local panorama video image, and synchronize the local panorama video image with the voice signals.

Alternatively, the terminal device participating in the conference under the broadband mobile hotspot device is configured to: collect video signals and voice signals of a user, perform synchronization processing, package the video signals and the voice signals in combination, obtain a multimedia package, and send the multimedia package to a broadband mobile hotspot device to which the terminal device participating in the conference under the broadband mobile hotspot device belongs through a wireless local area network adapter.

Alternatively, the terminal device participating in the conference under the broadband mobile hotspot device is further configured to: log in to a wireless access point to which the terminal device participating in the conference under the broadband mobile hotspot device belongs through the wireless local area network adapter, ask the multipoint conference server for joining the conference, and start to collect the video signals and the voice signals of the user after receiving permission information;

the multipoint conference server is further configured to: authenticate the terminal device, and return permission information or rejection information to the terminal device.

Alternatively, the video image mosaicking processor is configured to mosaic the local panorama video image and the panorama video images received by the wireless access point as the conference panorama video image by a way of increment mosaicking.

A broadband mobile hotspot device comprises: a wireless access point and a video image mosaicking processor, wherein:

the wireless access point is configured to: send a local panorama video image and voice signals to a multipoint conference server; receive panorama video images and voice signals sent by other broadband mobile hotspot devices participating in the conference from the multipoint conference server; and send a conference panorama video image and voice signals synchronized by the video image mosaicking processor to a terminal device participating in the conference under the broadband mobile hotspot device;

the video image mosaicking processor is configured to: mosaic the local panorama video image and the panorama video images received by the wireless access point as the conference panorama video image, and synchronize the conference panorama video image with the received voice signals.

Alternatively, the wireless access point is further configured to: receive video image signals and voice signals sent by the terminal device participating in the conference under the broadband mobile hotspot device;

the video image mosaicking processor is further configured to: separate the video image signals from the voice signals received by the wireless access point, perform image mosaicking processing on the video image signals, generate the local panorama video image, and synchronize the local panorama video image with the voice signals.

Alternatively, the video image mosaicking processor is configured to mosaic the local panorama video image and the panorama video images received by the wireless access point as the conference panorama video image by a way of increment mosaicking.

In conclusion, with the 3G and Wi-Fi characteristics and flexible mobility of the broadband mobile hotspot device, a distributed and expandable wireless network video conference system is constituted, which can solve a problem of transmission delay of multimedia signals well and solve a limitation that the conference room is required to be concentrated. The users can access the video conference system at any time and any place, which is not only feasible in the theoretical aspect but also completely operable in practice, thereby a combination of the Wi-Fi wireless local area network technology and the 3G wireless technology can be ideally implemented.

PREFERRED EMBODIMENTS OF THE INVENTION

Figure 1:
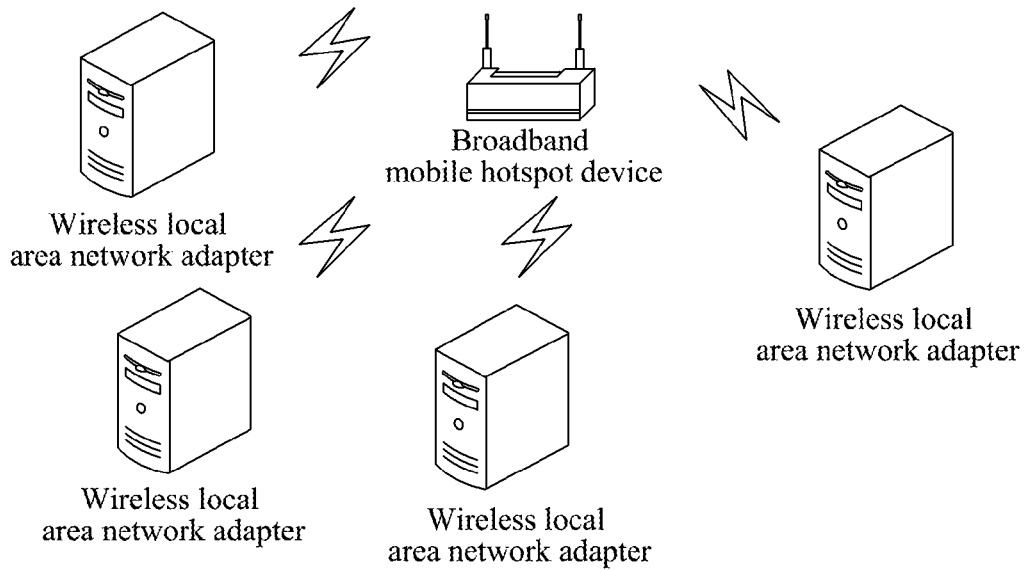
FIG. 1 is a structural diagram of a wireless local area network based on the broadband mobile hotspot device according to the embodiment.

A broadband mobile hotspot device is a wireless technology comprehensive application equipment which integrates the broadband wireless communication technology and the broadband wireless access technology. The broadband mobile hotspot device possesses functions of the 3G broadband wireless communication technology and the Wi-Fi broadband wireless access technology.

The examples of the present document will be described in detail in combination with the accompanying drawings below. It should be noted that the examples in the present document and the characteristics in the examples can be optionally combined with each other in the condition of no conflict.

In the embodiment, a video conference system is implemented based on the 3G and Wi-Fi characteristics of the broadband mobile hotspot device, the Wi-Fi broadband wireless access technology is adopted for a wireless local area network user to access the video conference system, and the 3G broadband wireless communication technology is adopted to implement communication between a near-end broadband mobile hotspot device and a far-end broadband mobile hotspot device.

A system for implementing a video conference in the embodiment includes:

a Wireless LAN Adapter (WLA), which is an access device of a terminal device, and is connected with the terminal device and a broadband mobile hotspot device through Wi-Fi signals;

a broadband mobile hotspot device, accessing the terminal device through a Wi-Fi local area network, and performing voice and video communication with a far-end broadband mobile hotspot device through the 3G wireless communication technology;

wherein, the broadband mobile hotspot device bears a wireless Access Point (AP), and the wireless AP is an aggregation of a wireless access node, a wireless router and a 3G module;

the broadband mobile hotspot device also bears a video image mosaicking processor, performs video image mosaicking processing on the scattered video images sent to the broadband mobile hotspot device, and generates a panorama video conference scenario image, and the video image mosaicking processor is integrated in the broadband mobile hotspot device; and a multipoint conference server, sending a local panorama video image and voice signals sent by the mobile hotspot device to other mobile hotspot devices participating in the conference except a sender.

A video image collector and a voice audio processor are configured on the terminal device, wherein, the video image collector is used to acquire video image signals of a user; and the voice audio processor is used to sample voice signals of the user and convert the simulated voice signals into Pulse Code Modulation (PCM) code stream signals.

The above system for implementing the video conference uses the wireless AP and the wireless local area network adapter as a topology network for network elements, broadband mobile hotspot devices are located in the Wi-Fi wireless local area network, and the broadband mobile hotspot devices are connected through the 3G wireless network.

A method for implementing a video conference in the embodiment includes the following steps.

In step A, a terminal device participating in the conference accesses a wireless AP borne on a broadband mobile hotspot device through a wireless local area network adapter.

In step B, the terminal device sends the scattered video image signals and voice signals to the wireless AP in the broadband mobile hotspot device through the wireless local area network adapter.

In step C, a video image mosaicking processor in the broadband mobile hotspot device performs mosaicking processing on the scattered video image signals received by the wireless AP, and generates a local panorama video conference scenario image.

In step D, a 3G module (integrated in the wireless AP) in the broadband mobile hotspot device sends the local panorama video conference scenario image and the voice signals obtained through mosaicking to a wireless multipoint conference server.

In step E, the wireless multipoint conference server forwards the panorama video conference scenario image and the voice signals (i.e. multimedia signals) sent by the broadband mobile hotspot device to a far-end broadband mobile hotspot device.

In step F, the far-end broadband mobile hotspot device broadcasts the multimedia signals to the terminal device participating in the conference within the local area network through the wireless local area network adapter.

In step G, after receiving the multimedia signals sent by the broadband mobile hotspot device, the terminal device displays a conference panorama video image, and broadcasts voice of a conference speaker at the meantime.

In the above steps, the voice signals and the image signal within the local area network are achieved through the broadband technology of the Wi-Fi wireless local area network; the voice signals and video signals between the broadband mobile hotspot devices are supported by the 3G wireless communication technology, and the video conference system is implemented through specialties and differences of the two technologies.

The implementation of the technical scheme will be further described in detail in combination with the accompanying drawings.

As shown in FIG. 1, it is an architecture of the system for implementing the video conference within the local area network according to the embodiment, which includes: a wireless local area network adapter, a wireless AP (borne in a broadband mobile hotspot device), and a video image collector and a voice audio processor on a terminal device, wherein:

the wireless local area network adapter is used for establishing a communication link between the terminal device and the wireless AP, the terminal device (such as a computer and so on) accesses a wireless local area network by an external wireless local area network adapter or a built-in wireless local area network adapter searching a Wi-Fi wireless AP, and the terminal device performs video and voice communication with the wireless AP through a Wi-Fi communication link.

The wireless AP provides Wi-Fi wireless local area network accessing and 3G wireless communication supporting and is a connection bridge between the terminal device and a conference system. The wireless AP is equivalent to an integration of a wireless router and a 3G module. A main function of wireless routing of the broadband mobile hotspot device is to provide the Wi-Fi access for the terminal device and perform routing protocol stack processing on the multimedia signals, which guarantees the correctness and instantaneity of data receiving and transmitting.

A main function of the 3G module is to provide the 3G wireless communication supporting, which can not only support a circuit switched network, but also support a packet switched network. The 3G wireless network of the embodiment supports both the transmission modes mentioned above. It is to perform wireless communication with a far-end broadband mobile hotspot device through the 3G wireless network.

In the embodiment, besides possessing functions of the wireless router and the 3G module, the broadband mobile hotspot device integrates a video image mosaicking processor at the meantime. A main function of the video image mosaicking processor is to perform image mosaicking processing on the input scattered video images and output a panorama video image. The video image mosaicking processor adopts an incremental mosaicking way. With regard to the panorama video images of the conference system, a panorama video image of one broadband mobile hotspot device is taken as a reference and panorama video images of all the other broadband mobile hotspot devices are mosaicked on the reference video image.

The video image collector acquires video image information of a user, and there are generally two kinds of video image collectors: external video image collectors and built-in video image collectors.

The voice audio processor converts a simulated voice signals input by the user through a microphone as a PCM code stream and sends the PCM code stream to a network user; and converts the PCM code stream broadcasted to the user as the simulated voice signals and broadcasts the simulated voice signals to the user through a headphone.

Figure 2:
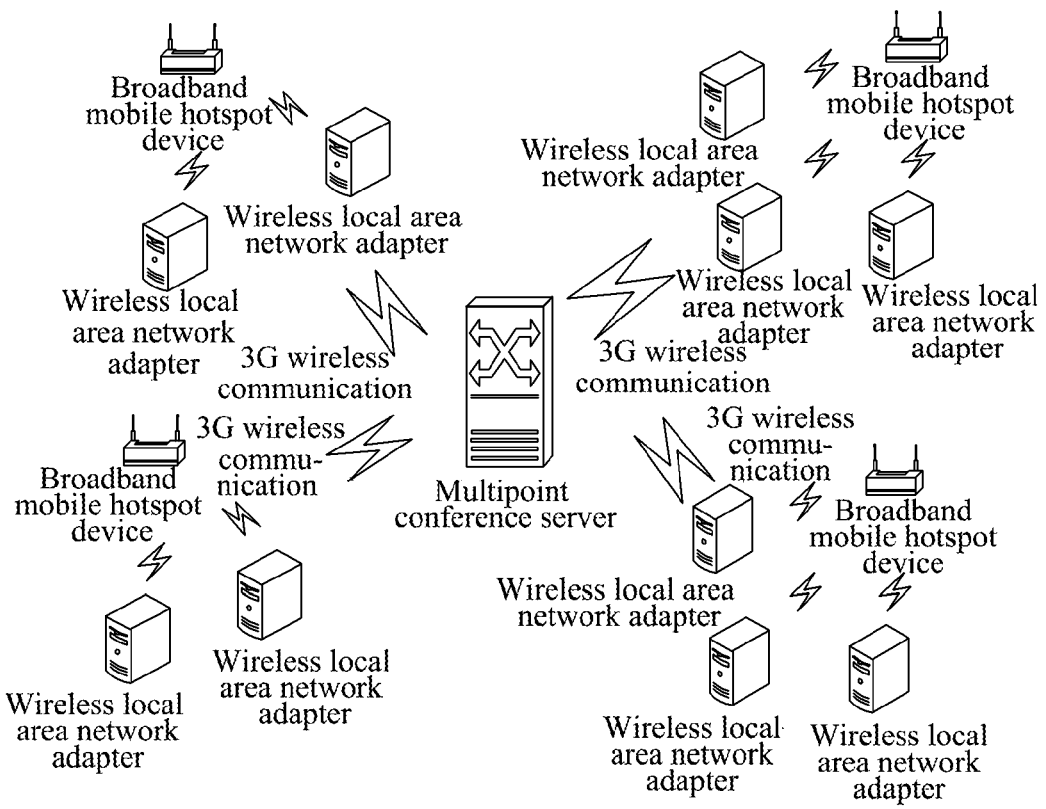
FIG. 2 is a topological diagram of a wireless network video conference system based on the broadband mobile hotspot devices according to the embodiment.

As shown in FIG. 2, it is a topological diagram of the system for implementing the video conference based on the broadband mobile hotspot devices, wherein:

a user accesses the video conference system through a wireless AP, a mobility of the wireless AP determines that the user accessing the wireless AP also moves with the wireless AP, thus the broadband mobile hotspot device is a mobile unit which is not limited by the region and space. The number of users of the broadband mobile hotspot device is determined by an access capacity of the wireless AP, the users hands over freely, and they can join or quit the conference system flexibly.

A multiparty conference is implemented through a wireless multipoint conference server between the broadband mobile hotspot devices, the broadband mobile hotspot device sends multimedia signals to the multipoint conference server through a 3G module, and the multipoint conference server forwards the multimedia signals to other broadband mobile hotspot devices.

An instantaneity of the video conference determines the instantaneity of video images and voices within the broadband mobile hotspot devices and between the broadband mobile hotspot devices. The real-time video image signals and voice signals of the terminal device are sent to the wireless AP through the Wi-Fi network, a video image mosaicking processor performs real-time image mosaicking and voice synchronization on the scattered video images of the user, and the synchronized multimedia signals is required to be sent to the terminal devices under the other broadband mobile hotspot devices in real time.

A conference panorama video image is generated by mosaicking a panorama video image of a local area network user of one wireless AP and panorama video images of local area network users of all the other wireless APs, and thus, the panorama video images transmitted between the wireless APs take the broadband mobile hotspot device as a unit.

The voice signals of the video conference system are determined by the wireless AP of the speaker. The characteristics of the conference system determine that only one person speaks each time. Therefore, transmission of the voice signals is unidirectional, and the voice signals is sent to each broadband mobile hotspot device in a form of broadcasting.

Figure 3:
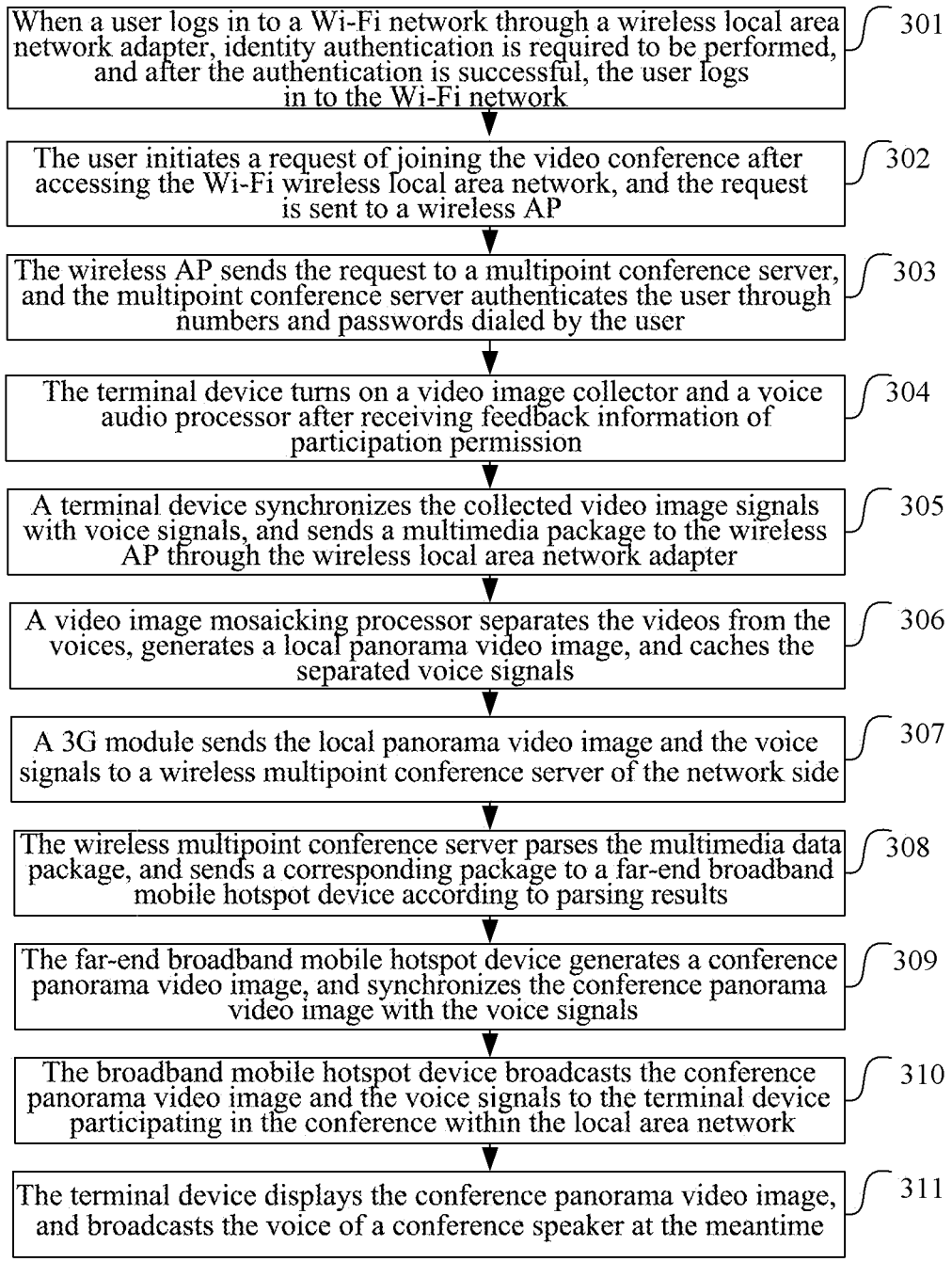
FIG. 3 is a flow diagram of a method for implementing a video conference based on the broadband mobile hotspot devices according to the embodiment.

The data transmitted in the video conference system are mainly video and voice signals, and transmission of these signals mainly depends on the bearing network. The terminal device participating in the conference joining the conference system is implemented by the wireless local area network adapter accessing the wireless AP in the Wi-Fi wireless local area network, and as shown in FIG. 3, a processing flow of implementing the video conference based on the broadband mobile hotspot devices includes the following steps.

In step 301, the access of the Wi-Fi wireless local area network has an identity authentication mechanism, when the user logs in to the Wi-Fi network through the wireless local area network adapter, identity authentication is required to be performed, and after the authentication is successful, the user logs in to the Wi-Fi network.

In step 302, the user initiates a request of joining the video conference after accessing the Wi-Fi wireless local area network, and the request is sent to the wireless AP.

In step 303, the wireless AP sends the request to the multipoint conference server, the multipoint conference server authenticates the user through numbers and passwords dialed by the user to guarantee a confidentiality of the conference, and feeds back permission information or rejection information to the terminal device after completing the authentication.

In step 304, the terminal device turns on the video image collector and the voice audio processor after receiving the feedback information of participation permission.

In step 305, the terminal device synchronizes the collected video image signals with voice signals to keep the pictures and voices synchronous, packages the videos and voices in combination through a multimedia protocol stack at the meantime, forms a multimedia package, and sends the multimedia package to the wireless AP in the broadband mobile hotspot device through the Wi-Fi wireless local area network through the wireless local area network adapter.

In step 306, after the broadband mobile hotspot device receives the multimedia package, the video image mosaicking processor separates the videos from the voices, performs image mosaicking processing on the separated video signals, generates a local panorama video image, and caches the separated voice signals at the meantime.

In step 307, the video image mosaicking processor of the broadband mobile hotspot device synchronizes the local panorama video image with the cached voice signals, and the 3G module sends the local panorama video image and the voice signals to the wireless multipoint conference server of the network side.

In step 308, the wireless multipoint conference server parses the multimedia data package according to a network protocol, and sends a corresponding package to a far-end broadband mobile hotspot device according to parsing results;

The function of the wireless multipoint conference server is to transmit communication data between the broadband mobile hotspot devices, and the wireless multipoint conference server is a bridge for connecting all the broadband mobile hotspot devices.

In step 309, a video image mosaicking processor of the far-end broadband mobile hotspot device separates the received panorama video images from the voice signals, performs mosaicking processing on the local panorama video image and the panorama video images sent by the other broadband mobile hotspot devices, generates a conference panorama video image, and synchronizes the conference panorama video image with the voice signals;

The conference panorama video image of each broadband mobile hotspot device is constituted by mosaicking the panorama video images of the local user and the panorama video images of the other broadband mobile hotspot devices in the system.

In step 310, the broadband mobile hotspot device broadcasts the conference panorama video image and the voice signals to the terminal device participating in the conference within the local area network through the Wi-Fi wireless local area network.

In step 311, after receiving the conference panorama video image and the voice signals sent by the broadband mobile hotspot device, the terminal device displays the conference panorama video image, and broadcasts the voice of the conference speaker at the meantime.

Figure 4:
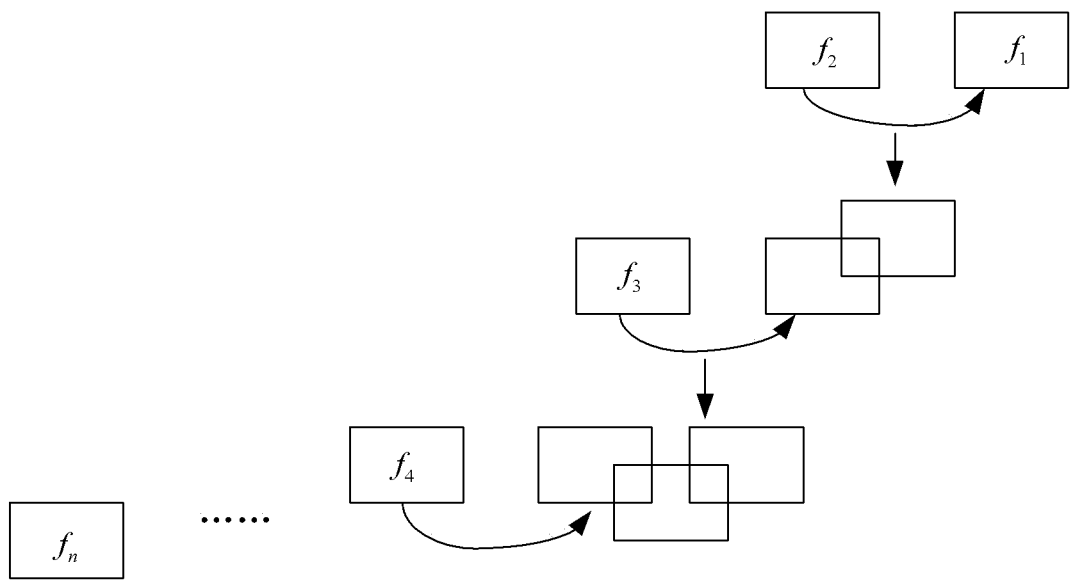
FIG. 4 is a method for mosaicking panorama video images adopted in the embodiment.

As shown in FIG. 4, it is a method for mosaicking the panorama video images of the wireless network conference system, a mosaicking way of frame-to-mosaicked image is used in the embodiment, that is, the current image frame is mosaicked with the mosaicked image, and this compound way is also called as the dynamic image mosaicking technology, that is, the current image content is used to update the current mosaicked image content by a way of increment processing. Since an incremental mosaicking way is adopted, when a moving object exists in the scenario, with respect to the mosaicked image obtained by using the dynamic image mosaicking technology, a phenomenon that the moving object disappears will not occur. A schematic diagram of the compound way of frame-to-mosaicked image is shown in FIG. 4, and the drawing $f_1$ is a reference video image here.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above description is only the preferred examples of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

In the above embodiment, with the 3G and Wi-Fi characteristics and flexible mobility of the broadband mobile hotspot device, a distributed and expandable wireless network video conference system is constituted, which can solve a problem of the transmission delay of multimedia signals well and solve a limitation that the conference room is required to be concentrated. The users can access the video conference system at any time and any place, which is not only feasible for the theoretical aspect but also completely operable in practice, thereby a combination of the Wi-Fi wireless local area network technology and the 3G wireless technology can be ideally implemented.

What is claimed is:

1. A method for implementing a video conference, comprising:

each broadband mobile hotspot device participating in the video conference sending a local panorama video image and voice signals to a multipoint conference server; wherein the local panorama video image of each broadband mobile hotspot device participating in the video conference is generated by performing image mosaicking processing on video image signals sent by terminal devices participating in the video conference under the broadband mobile hotspot device to which the terminal devices belong;

the multipoint conference server sending the received panorama video images and voice signals of each broadband mobile hotspot device participating in the video conference to other broadband mobile hotspot devices participating in the video conference except a sender; and after receiving the panorama video images and the voice signals of the other broadband mobile hotspot devices participating in the video conference, each broadband mobile hotspot device participating in the video conference mosaicking its own local panorama video image and the received panorama video images of the other broadband mobile hotspot devices as a conference panorama video image, and synchronizing the conference panorama video image with the received voice signals, and then sending the synchronized conference panorama video image and voice signals to the terminal devices participating in the video conference under each broadband mobile hotspot device;

wherein each broadband mobile hotspot device is a wireless comprehensive application equipment which integrates 3G broadband wireless communication technology and Wi-Fi broadband wireless access technology, the terminal devices accessing to the broadband mobile hotspot device through a Wi-Fi local area network, and each broadband mobile hotspot device communicating with the multipoint conference server through 3G wireless communication technology;

wherein the multipoint conference server authenticates the terminal devices, and returns permission information or rejection information to the terminal devices; and the terminal devices starting to collect the video image signals and the voice signals of the user after receiving the permission information.

2. The method according to claim 1, further comprising:

before sending the local panorama video image and the voice signals to the multipoint conference server, each broadband mobile hotspot device participating in the video conference receiving video image signals and voice signals sent by the terminal devices participating in the video conference under each broadband mobile hotspot device participating in the video conference, separating the video image signals from the voice signals, performing image mosaicking processing on the video image signals, generating the local panorama video image, synchronizing the local panorama video image with the voice signals, and sending the synchronized local panorama video image and voice signals to the multipoint conference server.

3. The method according to claim 2, further comprising:
before the terminal devices participating in the video conference under each broadband mobile hotspot device sending the video image signals and the voice signals to the broadband mobile hotspot device, the terminal devices participating in the video conference under each broadband mobile hotspot device collecting video image signals and voice signals of a user, performing synchronization processing, packaging the video image signals and the voice signals, obtaining a multimedia package, and sending the multimedia package to a broadband mobile hotspot device to which the terminal devices participating in the video conference belong through a wireless local area network adapter.

4. The method according to claim 3, further comprising:
before the terminal devices participating in the video conference under each broadband mobile hotspot device collecting the video image signals and the voice signals of the user, the terminal devices participating in the video conference under each broadband mobile hotspot device logging in to the broadband mobile hotspot device to which the terminal devices participating in the video conference under each broadband mobile hotspot device belong through the wireless local area network adapter, and asking the multipoint conference server for joining the video conference.

5. A system for implementing a video conference, comprising: a broadband mobile hotspot device and a multipoint conference server, wherein:
the broadband mobile hotspot device is a wireless comprehensive application equipment which integrates 3G broadband wireless communication technology and Wi-Fi broadband wireless access technology, and terminal devices accessing to the broadband mobile hotspot device through a Wi-Fi local area network, and the broadband mobile hotspot device communicating with the multipoint conference server through 3G wireless communication technology;
the broadband mobile hotspot device is configured to: send a local panorama video image and voice signals to the multipoint conference server; after receiving panorama video images and the voice signals sent by other broadband mobile hotspot devices from the multipoint conference server, mosaic the local panorama video image and the received panorama video images as a conference panorama video image, and after synchronizing the conference panorama video image with the received voice signals, send the synchronized conference panorama video image and voice signals to the terminal devices participating in the video conference under the broadband mobile hotspot device; wherein the local panorama video image is generated by performing image mosaicking processing on video image signals sent by the terminal devices participating in the video conference under the broadband mobile hotspot device to which each terminal device belongs;
the multipoint conference server is configured to: send the local panorama video image and the voice signals sent by the broadband mobile hotspot device to the other broadband mobile hotspot devices participating in the video conference except a sender;
wherein the multipoint conference server is configured to authenticate the terminal devices, and return permission information or rejection information to the terminal devices; and
the terminal devices are configured to start to collect the video image signals and the voice signals of the user after receiving the permission information.

6. The system according to claim 5, wherein, the broadband mobile hotspot device comprises a wireless access point and a video image mosaicking processor, wherein:
the wireless access point is configured to: send the local panorama video image and the voice signals to the multipoint conference server; receive the panorama video images and the voice signals sent by the other broadband mobile hotspot devices participating in the video conference; and send the conference panorama video image and voice signals synchronized by the video image mosaicking processor to the terminal devices participating in the video conference under the broadband mobile hotspot device;
the video image mosaicking processor is configured to: mosaic the local panorama video image and the panorama video images received by the wireless access point as the conference panorama video image, and synchronize the conference panorama video image with the received voice signals.

7. The system according to claim 6, wherein,
the wireless access point is further configured to: receive video image signals and voice signals sent by the terminal devices participating in the video conference under the broadband mobile hotspot device;
the video image mosaicking processor is further configured to: separate the video image signals from the voice signals received by the wireless access point, perform image mosaicking processing on the video image signals, generate the local panorama video image, and synchronize the local panorama video image and the voice signals.

8. The system according to claim 7, wherein,
the terminal devices participating in the video conference under the broadband mobile hotspot device are configured to: collect video signals and voice signals of a user, perform synchronous processing, package the video signals and the voice signals in combination, obtain a multimedia package, and send the multimedia package to the broadband mobile hotspot device to which the terminal devices participating in the video conference belong through a wireless local area network adapter.

9. The system according to claim 8, wherein,
the terminal devices participating in the video conference under the broadband mobile hotspot device are further configured to: log in to a wireless access point to which the terminal devices participating in the video conference under the broadband mobile hotspot device belong through the wireless local area network adapter, ask the multipoint conference server for joining the video conference, and start to collect the video signals and the voice signals of the user after receiving permission information;
the multipoint conference server is further configured to: authenticate the terminal devices, and return permission information or rejection information to the terminal devices.

10. The system according to claim 8, wherein, the video image mosaicking processor is configured to mosaic the local panorama video image and the panorama video images received by the wireless access point as the conference panorama video image by a way of increment mosaicking.

11. A broadband mobile hotspot device, comprising: a wireless access point and a video image mosaicking processor, wherein:

the broadband mobile hotspot device is a wireless comprehensive application equipment which integrates 3G broadband wireless communication technology and Wi-Fi broadband wireless access technology, terminal devices accessing to the broadband mobile hotspot device through a Wi-Fi local area network, and the broadband mobile hotspot device communicating with a multipoint conference server through 3G wireless communication technology;

the wireless access point is configured to: send a local panorama video image and voice signals to the multipoint conference server; receive panorama video images and voice signals sent by other broadband mobile hotspot devices participating in the video conference from the multipoint conference server; and send a conference panorama video image and voice signals synchronized by the video image mosaicking processor to the terminal devices participating in the video conference under the broadband mobile hotspot device; wherein the local panorama video image is generated by performing image mosaicking processing on video image signals sent by the terminal devices participating in the video conference under the broadband mobile hotspot device to which the terminal devices belong;

the video image mosaicking processor is configured to: mosaic the local panorama video image and the panorama video images received by the wireless access point as the conference panorama video image, and synchronize the conference panorama video image with the received voice signals;

wherein the multipoint conference server is configured to authenticate the terminal devices, and return permission information or rejection information to the terminal devices; and the terminal devices starting to collect the video image signals and the voice signals of the user after receiving the permission information.

12. The broadband mobile hotspot device according to claim 11, wherein, the wireless access point is further configured to: receive video image signals and voice signals sent by the terminal devices participating in the video conference under the broadband mobile hotspot device;

the video image mosaicking processor is further configured to: separate the video image signals from the voice signals received by the wireless access point, perform image mosaicking processing on the video image signals, generate the local panorama video image, and synchronize the local panorama video image with the voice signals.

13. The broadband mobile hotspot device according to claim 12, wherein, the video image mosaicking processor is configured to mosaic the local panorama video image and the panorama video images received by the wireless access point as the conference panorama video image by a way of increment mosaicking.

* * * * *